No. 651,173.   R. T. WEAVER.   Patented June 5, 1900.
FILTER.
(Application filed Nov. 23, 1899.)

(No Model.)   2 Sheets—Sheet 1.

Witnesses:-
Robert S. Blake
Louis M. F. Whitehead

Inventor:-
Robert T. Weaver
by his Attorneys:-
Hmm & Hmm

UNITED STATES PATENT OFFICE.

ROBERT T. WEAVER, OF PHILADELPHIA, PENNSYLVANIA.

FILTER.

SPECIFICATION forming part of Letters Patent No. 651,173, dated June 5, 1900.

Application filed November 23, 1899. Serial No. 738,092. (No model.)

*To all whom it may concern:*

Be it known that I, ROBERT T. WEAVER, a citizen of the United States, residing in Philadelphia, Pennsylvania, have invented certain Improvements in Filters, of which the following is a specification.

The main object of my invention is to so construct a filter that the water will pass upward through one filtering-chamber and down through another.

A further object of the invention is to make a two-section filter, with the water-inlets for the two sections at the center, in such a manner that the filter can be readily taken apart, and a still further object of the invention is to provide ready means for cleansing the admission-chamber to the first filter.

Figure 1:
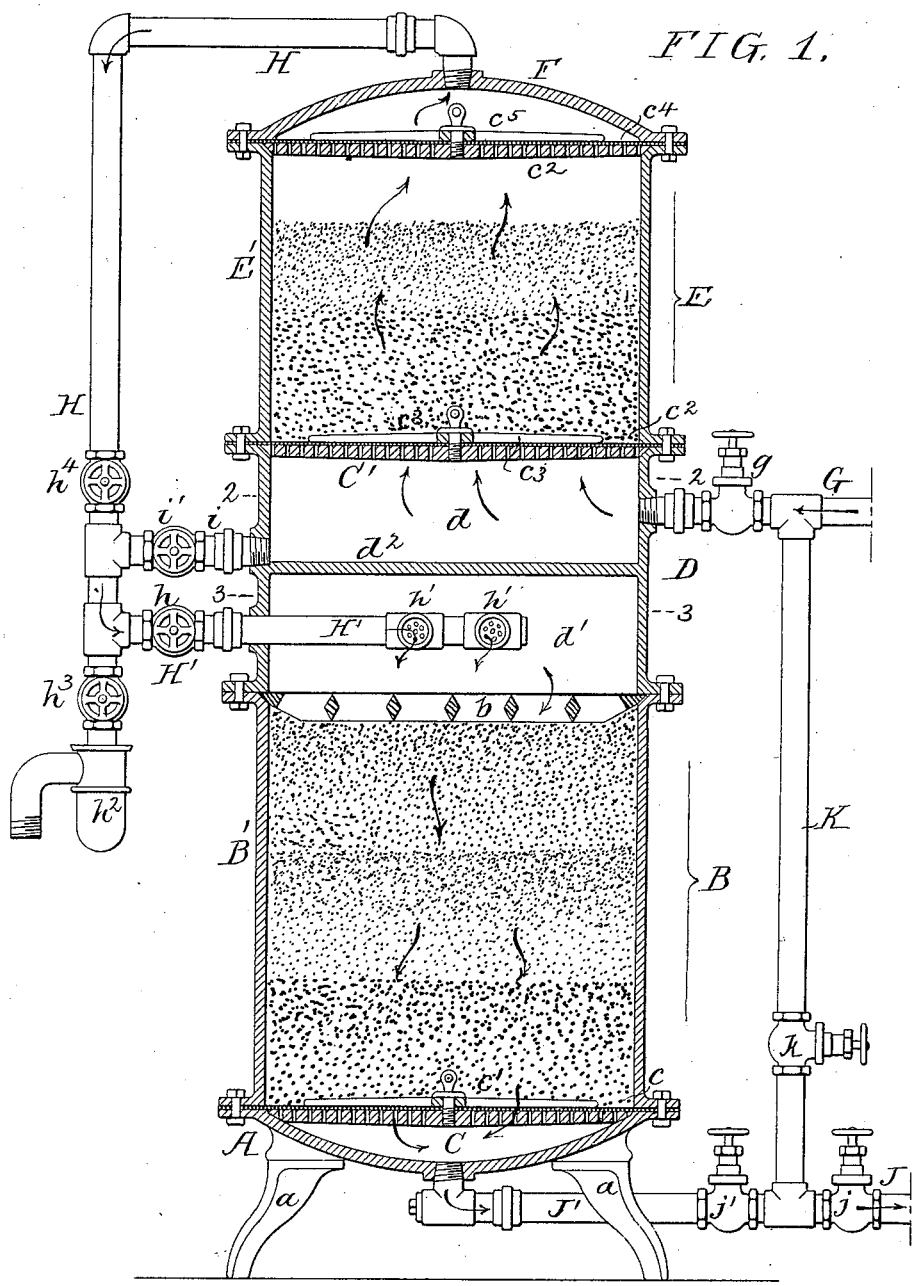
Figure 2:
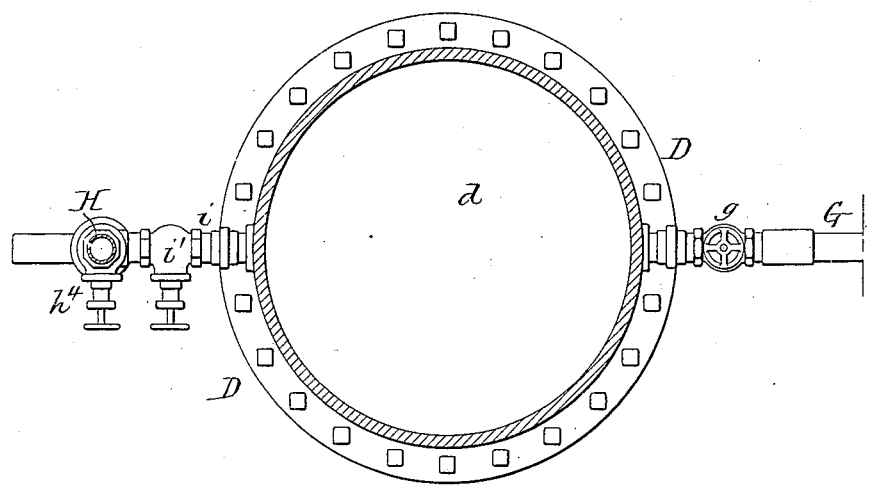

In the accompanying drawings, Figure 1 is a vertical sectional view of my improved filter. Fig. 2 is a sectional plan view on the line 2 2, Fig. 1; and Fig. 3 is a sectional view on the line 3 3, Fig. 1.

The filter has a base-section A, mounted in the present instance on suitable feet $a$ $a$, and on this section is mounted the second filtering-chamber B. Adapted to a beveled seat in the section A is a perforated partition-plate C, having a screen $c$ mounted upon it and held in place by the spider $c'$. The partition-plate C is clamped to its seat by the casing B', as clearly shown in the drawings. In this section I preferably place three layers of filtering material, as indicated. This may be any suitable material—such as bone-black, charcoal, &c.—or a single filtering medium may be used in place of the three, if desired.

Figure 3:
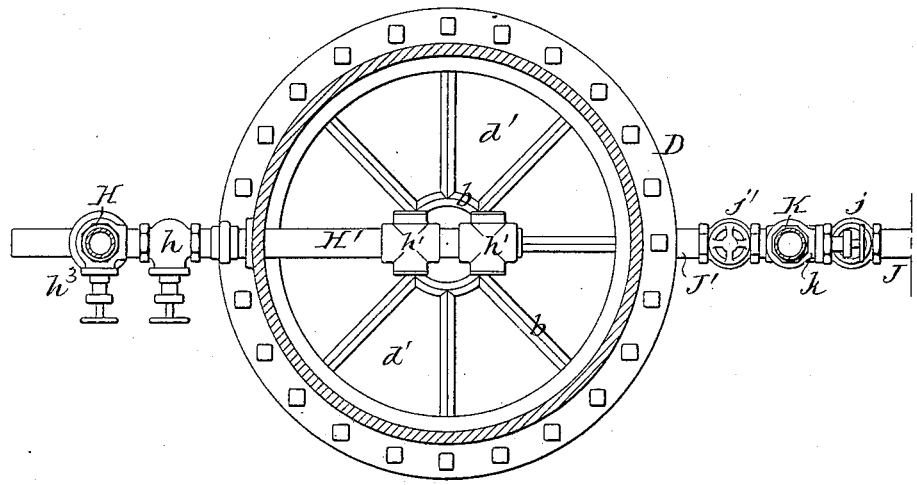

Resting in a beveled seat in the upper portion of the casing B' is a cutting-plate $b$, having arms diamond-shaped in cross-section, as clearly shown in Fig. 3. This cutting-plate holds the filtering material in place, and when it is wished to cleanse the filtering material in the chamber B by reversing the current of water the material is forced up through the spaces between the arms, and the sharp edges of the plate break up any material that would form into lumps, so that when the filtering material settles again it will be in condition to properly filter the water passing through it.

D is the intermediate section, and E is the upper or first filtering-chamber. The section D contains the inlet-chamber $d$ to the first filter and the inlet-chamber $d'$ to the second filter. A solid partition $d^2$, forming part of the casing, separates the two chambers.

Resting in a beveled seat in the upper portion of the casing D is a perforated partition-plate C', on which is a screen $c^2$, held in place by a spider $c^3$.

Within the chamber E, above the partition-plate C', is a suitable filtering material, such as sand and gravel, preferably arranged in layers, and resting in a beveled seat in the upper portion of the casing E' is a partition-plate $C^2$, having a screen $c^4$ and a spider $c^5$.

F is a cap for the filter, which also holds the partition-plate $C^2$ in place.

The several sections are flanged and bolted together as shown, thus rigidly holding the several partition-plates in position.

G is the inlet-pipe, which is connected to the water-main or other suitable source of supply, and this pipe enters the chamber $d$, as shown in Fig. 1, and is provided with a valve $g$, by which the supply of water can be cut off.

H is a pipe communicating at its upper end with a chamber above the first filtering-section E. The lower end of this pipe is connected to the inlet-pipe H', which extends into the chamber $d'$ of the second filtering-section. The pipe H' has a suitable valve $h$ and has perforated heads $h'$, through which the water passes. The pipe is so situated and the perforations of such a size as to prevent the filtering material passing through the pipe during the cleansing process when the current through the filter is reversed.

$i$ is a pipe communicating with the bottom of the first inlet-chamber $d$ and with the pipe H and has a suitable valve $i'$. The pipe H is extended past the pipe H' and communicates with the waste through a trap $h^2$. A valve $h^3$ is situated between the pipe H' and the trap, so as to cut off communication between the pipe H and the waste.

J is an outlet-pipe for filtered water communicating with a pipe J', which in turn communicates with the chamber within the base A, which receives filtered water from the second filtering-chamber. In the pipe J is a valve $j$, and in the pipe J' is a valve $j'$. Coupled to the pipes between the two valves is a connecting-pipe K, communicating with the inlet-pipe G, as shown. This pipe K has a valve k.

The operation of the device is as follows: Suitable filtering materials are placed in the chambers B and E, and when the several sections are coupled together the valve g of the inlet-pipe G is opened, the valve k closed, the valves j j' opened, the valve h of the pipe H' opened, and the valves i' and h³ closed. The water will then pass through the filter in the direction indicated by the arrows, first into the chamber d, then up through the filtering material in the chamber E, through the pipes H and H' into the chamber d', down through the filtering material in the chamber B, and out the outlet-pipes J' and J. By this arrangement the water is doubly filtered. If it is wished to clean the inlet-chamber d, all that is necessary is to open the valves i' and h³ and close the valve h, when the water entering the chamber d will pass out the pipe i to waste, carrying with it any sediment or mud collected in the chamber. When it is desired to use the lower filtering-chamber only, the valves h³ and h⁴ in the pipes H may be closed and the valves i' and h opened, when the water will pass through the chamber d, through the pipes i and H' into the chamber d', and through the filtering material in the chamber B. When it is wished to cleanse the lower filtering-chamber B, the valve g is closed, as well as the valve j, and the valve k is opened. The valves i' and h⁴ are also closed and the valves h and h³ opened, so that the water will pass through the inlet-pipe G, down the pipe K, through the pipe J', up through the filtering material in the chamber B, through the pipe H' to the pipe H and to waste. The water passing up through the filtering material will agitate the mass, carrying off any foreign matter on the surface of the filtering material, at the same time closing up any direct waterways made through the filtering material.

I claim as my invention—

1. The combination in a filter, of two sections each having filtering material therein, a central section having two chambers, one for the inlet of water to the first filtering-section and the other for the inlet of water to the second filtering-chamber, inlet and outlet pipes connected to the filter, and a pipe connecting the upper filtering-section to the lower filtering-section, substantially as described.

2. The combination of the two filtering-sections, a central section having two chambers therein, one for the inlet of water to the first filtering-chamber and the other for the inlet of water to the second filtering-chamber, an inlet-pipe communicating with the first filtering-chamber, a pipe communicating with the upper end of the first filtering-chamber and the inlet-chamber of the second filter and with the waste, and an outlet-pipe for filtered water communicating with the bottom of said second filtering-chamber, substantially as described.

3. The combination in a filter, of the two filtering-chambers, one mounted above the other, a section mounted between the two filtering-chambers and containing the inlet-chambers for the first and second filtering-chambers, an inlet-pipe communicating with the upper chamber of the section, a pipe communicating with the upper end of the first filtering-chamber and with the inlet-chamber of the second filter with the waste and with a pipe leading from the bottom of the first inlet-chamber, a pipe communicating with the bottom of the filter and connected to the water-supply and to the outlet for filtered water, and valves in the several pipes by which the flow of water through the filter is controlled, substantially as described.

4. The combination of the base A, a perforated partition-plate mounted thereon, a casing B' containing filtering material, a cutting-plate b mounted thereon, a casing D having a solid partition-plate d² separating the said casing into two chambers d and d', a perforated partition-plate mounted on the casing D, a casing E' containing filtering material, a perforated partition-plate mounted thereon, and a cap F, inlet-pipe G communicating with the chamber d, an outlet-pipe communicating with the base-section A, a pipe H communicating with the cap-section F and with the chambers d and d', and valves in said pipes, substantially as described.

5. The combination in a filter, an inlet-chamber at the upper end and an outlet-chamber at the base, a supply-pipe, an outlet for filtered water, a pipe at the base communicating with the supply-pipe and with the outlet for filtered water, an inlet-pipe communicating with the supply-pipe, a waste-pipe, valves in the several pipes, a cutting-plate mounted above the filtering material in the chamber, the arms of said cutting-plate being diamond-shaped in cross-section, providing sharp upper and lower edges, said valves being so arranged that the water in filtering will pass down through the filtering material and the water in washing will pass up through the filtering material, substantially as described.

In testimony whereof I have signed my name to this specification in the presence of two subscribing witnesses.

ROBERT T. WEAVER.

Witnesses:
WILL. A. BARR,
JOS. H. KLEIN.